United States Patent [19]

Plumat et al.

[11] 3,850,665

[45] Nov. 26, 1974

[54] PROCESS FOR FORMING A METAL OXIDE COATING ON A SUBSTRATE AND RESULTING PRODUCTS

[75] Inventors: Emile Plumat, Gilly; Robert Posset, Mont/S/Marchienne, both of Belgium

[73] Assignee: Glaverbel Watermael-Boitsfort, Brussels, Belgium

[22] Filed: July 6, 1972

[21] Appl. No.: 269,378

[30] Foreign Application Priority Data
July 8, 1971 Luxembourg .......................... 63485

[52] U.S. Cl. ................. 117/33.3, 65/60, 117/124 A, 117/124 B, 117/124 D, 260/429 J, 350/1
[51] Int. Cl. ... B32d 17/06, G02b 5/20, C03c 17/22
[58] Field of Search .......... 65/60; 117/33.3, 124 A, 117/124 B, 124 D; 260/429 J

[56] References Cited
UNITED STATES PATENTS

| 2,859,131 | 11/1958 | Watkins .......................... 117/124 B |
| 2,976,285 | 3/1961 | Gash .................................. 260/242 |
| 3,107,177 | 10/1963 | Saunders ........................ 117/124 A |
| 3,410,710 | 10/1959 | Mochel .............................. 117/33.3 |
| 3,411,934 | 11/1968 | Englehart ................................ 65/60 |
| 3,652,246 | 3/1972 | Michelotti et al. ..................... 65/60 |
| 3,711,322 | 1/1973 | Kushibashi ..................... 117/124 A |

FOREIGN PATENTS OR APPLICATIONS 1,035,872   8/1958   Germany

Primary Examiner—William D. Martin
Assistant Examiner—William H. Schmidt
Attorney, Agent, or Firm—Edmund M. Jaskiewicz

[57] ABSTRACT

A metal oxide coating is formed on a vitreous or non-vitreous substrate by applying to a substrate a composition comprising an acetyl acetonate coprecipitate of two or more metals. The substrate and composition are simultaneously or subsequently heated to convert the coprecipitate on the substrate to leave a metal oxide coating which is at least partly composed of an oxidic compound containing two or more metals.

19 Claims, No Drawings

PROCESS FOR FORMING A METAL OXIDE COATING ON A SUBSTRATE AND RESULTING PRODUCTS

The present invention relates to a substrate having a metal oxide coating thereon, more particularly, to the process of forming such a coating by applying a metal compound to a substrate and converting the applied composition by heating in situ to leave a metal oxide coating, the coating compositions used in this process and the articles coated by such process.

It has been known to form oxide coatings such as cobalt oxide, or a mixture of oxides, for instance cobalt and iron oxides, on a surface of vitreous material by spraying an aqueous salt solution, e.g., an aqueous solution of cobalt chloride or of cobalt chloride and iron chloride, onto such surface while this surface is at a suitable temperature to cause conversion of the metal salt(s) in situ. It is not possible by this process to form a coating with properties fulfilling any specification which may from time to time be required for a given purpose because the factors influencing the properties of the coating are not infinitely variable. One of these factors is the choice of metal compounds used in forming the coating.

It is therefore the principal object of the present invention to provide a process whereby metal oxide coatings with optical and other specifications which are not attainable by using previously known methods can be produced.

One aspect of the present invention is a process in which a composition comprising an acetyl acetonate coprecipitate of two or more metals is applied to the substrate and is simultaneously or subsequently heated to bring about conversion of the coprecipitate on the substrate to leave a metal oxide coating which is at least partly composed of an oxidic compound containing two or more metals.

With the process according to the present invention it is possible to form metal oxide coatings with specifications which cannot be obtained by previously known processes of the prior art. The process according to the present invention now renders it possible to form light-transmitting coatings with light-transmitting and/or light-reflecting properties different from those possessed by metal oxide coatings obtainable by the above described known process. The metal oxide coatings formed by a process according to the invention have a novel structure. The process can be used for coating a variety of different substrates. Particular mention is made of the use of the process for forming metal oxide coatings on vitreous substrates, e.g., glazing sheets and vehicle windscreens, to which substrates the new coatings in many cases show much better adherence than coatings formed by the previously known process. This and other further advantages of the invention will be subsequently described in more detail.

It has been found that there are important differences between an acetyl acetonate coprecipitate of two metals on the one hand and a mixture of an acetyl acetonate of one metal with an acetyl acetonate of another metal on the other hand, even though the molar concentrations are identical in the two cases. For instance, the properties of an acetyl acetonate coprecipitate of vanadium and iron (containing equimolar amounts of vanadium and iron) differ from the properties of an equimolar mixture of an acetyl acetonate of vanadium and an acetyl acetonate of iron. The substances differ, e.g., in tint. Vanadium and iron are here taken only by way of example. Comparison of other acetyl acetonate coprecipitates with mixtures of acetyl acetonates of the corresponding metals likewise show differences.

If a mixture of acetyl acetonates is sprayed and decomposed on a hot glass surface, the result is a coating comprising a mixture of two oxides forming what is known as a solid solution. In a solid solution of this kind, the relative concentrations of the two oxides can vary between 0 and 100 percent. The properties of the coating are predictable from the known properties of coatings formed of the individual oxides, the law of additivity being applicable, e.g., as regards the tint of the coating. Thus, by spraying and converting mixtures of vanadium acetyl acetonate and iron acetyl acetonate, it is possible to obtain coatings the tints of which, viewed by transmitted light, are in the range yellow to green, depending on the relative concentrations of the different acetyl acetonates. However, by spraying and pyrolysis of an acetyl acetonate coprecipitate of vanadium and iron, coatings which are of greenish-grey tint as viewed by transmitted light are obtained. The law of additivity therefore does not apply in the latter case. The acetyl acetonate coprecipitate of vanadium and iron is itself bright red, while an equimolar mixture of the acetyl acetonates of such metals is brownish red.

Thus it is that by using a process according to the invention coatings with tints different from those obtained by the known process can be formed.

It is moreover to be noted that by performing a process according to the invention, the formed coating always comprises an oxidic compound containing the two or more metals, i.e., there is present a mixed metal oxide in which the elements are in stoichiometric proportions forming a true molecule of definite composition. If the acetyl acetonate coprecipitate contains two metals in other relative proportions, then the oxide coating will contain a certain amount of oxide of the metal present in excess, in addition to a true oxidic compound containing the two metals.

A further indication of the difference between an acetyl acetonate coprecipitate as used according to the invention, and a mixture of acetyl acetonates of the different metals is the fact that the solubility of the coprecipitate in a given solvent, e.g., acetic acid or dimethylformamide, is often higher than that of the corresponding mixture of two simple acetyl acetonates. In some cases, when preparing a mixture of an acetyl acetonate of one metal with an acetyl acetonate of another metal, one of the acetyl acetonates has to be recrystallised in alcohol. This is the case for example when preparing a mixture of cobalt acetyl acetonate and iron acetyl acetonate. By way of contrast, when an acetyl acetonate coprecipitate of cobalt and iron is formed, it is directly formed in perfectly crystallised state.

Another noteworthy fact is that usually a light-transmitting coating comprising an oxidic compound containing two or more metals and formed according to the invention usually has a rather high light-transmission/total energy transmission ratio as compared with a coating containing the same elements but in the form of a mixture of oxides.

In most cases the oxide coatings formed according to the invention are very hard. Moreover, when applying the coating compositions by the preferred techniques hereinafter referred to, the coatings are strongly adherent to vitreous surfaces. This is in marked contrast to coatings formed by the previously known process, which can often be removed in the form of particles simply by rubbing a finger along the coating or by applying a piece of adhesive tape onto the coating and then peeling the tape away. In general, coatings formed according to the invention have a high refractive index and optical coatings can therefore be produced which have very good radiation-reflecting properties.

The acetyl acetonate coprecipitate selected for applying to the substrate can be applied by vaporising the coprecipitate at relatively low temperature and if necessary at reduced pressure, to form on the substrate a deposit which is then converted by thermal treatment and further oxidation into the metal oxide coating. Although this procedure gives acceptable results in certain cases and for certain prupuses, it is not ideal. Usually, it is difficult to ensure complete oxidation of all of the metal and the presence of unoxidized metal particules impairs the quality of the coating and its adherence to the substrate. Coating by evaporation can be achieved by vaporising the coprecipitate in the presence of an inert gas and bringing the vapor into contact with the substrate while this is at elevated temperature, in the presence of oxygen. However, this special procedure is technically rather complicated and even then the results are not of the highest quality.

An alternative procedure is to apply the coprecipitate in dispersed state is a liquid medium, but while this procedure also is not excluded it is not the most preferable one. By applying the coprecipitate as a dispersion in a liquid medium and converting the coprecipitate in situ on the substrate it is possible to produce oxide coatings of the new structure and therefore possessing concomitant advantages. However, it is difficult to produce coatings which have over their entire area predetermined optical properties as is usually required in the case of optical coatings intended to impart modified radiation-transmitting and/or radiation-reflecting properties to bodies or articles of vitreous or partly vitreous composition.

The preferred coating procedure is to apply the coprecipitate in dissolved state. Accordingly, in the most preferred embodiments of the present invention, the acetyl acetonate coprecipitate is applied to the substrate in solution in a liquid solvent. With this procedure, coatings which are of very good quality can be readily obtained.

Preferably the substrate is preheated to a sufficiently high temperature to provide the heat required to effect the conversion of the coating composition to form the metal oxide coating. By thus preheating the substrate it is possible to bring about evaporation of the solvent and conversion of the coprecipitate substantially immediately on contact of the solution with the substrate. This rapid conversion promotes coating uniformity. In general, for the purposes primarily in view, the optimum temperature of the substrate at the time that it is coated is in the range 300 to 700°C. The temperature should in general be chosen as high as possible consistent with avoiding impairment of the substrate. For coating vitreous substrates, the preferred temperature range is 450° to 650°C. By working within this range, very uniform coatings can be formed and very strong adherence of the coating to the vitreous substrate can be achieved. This adherence also is influenced by the temperature of the substrate on coating.

The solution of the coprecipitate is preferably applied in the form of droplets. The required results can be most easily achieved by applying the solution in that form. Use can be made of an inside-mixing atomizing gun fed separately with compressed air and the coating solution, both at the same pressure, which may e.g., be of the order of 2.0 kg/cm$^2$ above atmospheric pressure. The solution itself can be at ambient temperature or any higher temperature, provided that there is no undue premature evaporation of the solvent or decomposition and oxidation of the coprecipitate and provided further that the substrate is not subjected to a harmful thermal shock.

When using the preferred coating procedure wherein the coprecipitate is applied as a solution to the substrate, the choice of solvent is a material factor influencing the quality of the final coating. When it is important to form coatings of a very high standard of uniformity insofar as their optical and other properties are concerned, it is preferred to select a solvent which is a very good solvent for the coprecipitate so that the latter can be applied in fairly concentrated solution. Another factor which has often to be taken into account in selecting the solvent is the risk of fire or explosion when working under high temperature conditions.

In the most preferred embodiments of the invention, the acetyl acetonate coprecipitate is applied in solution in an aprotonic solvent, a substituted or unsubstituted monocarboxylic acid solvent, an amine or diamine solvent, or a mixture of two or more solvents selected from solvents of those classes. In general, such solvents are very good solvents for acetyl acetonate coprecipitates most suitable for use in forming metal oxide surface coatings, in particular optical coatings. Such a coprecipitate can therefore be applied in relatively highly concentrated solution. Such solvents can also be used in conditions in which they are exposed to very high temperatures. It is therefore possible to bring about very rapid heating and evaporation of the solvent from the applied coating, and rapid conversion of the coprecipitate, which factors are also important for promoting the formation of coatings of uniform density. By using such solvents it is possible to form high quality optical coatings which adhere quite strongly to vitreous and partly vitreous substrates, e.g., optical coatings for tinting or otherwise modifying the optical properties of glazing sheets, windscreens, sheets of patterned rolled glass, lenses for sunglasses, and other vitreous articles.

As examples of suitable aprotonic solvents, the following are included: dimethylformamide, dimethylacetamide, tetramethylurea, dimethylsulphoxide, acetonitrile, nitrobenzene, ethylene carbonate, tetramethylene sulphone, hexamethylphosphoramide.

Dimethylformamide is a particularly good solvent for most of the acetyl acetonate coprecipitates which are of interest for forming optical coatings so that such coprecipitates can be applied in high concentrations. This means that the volume rate of application of the solution to a given area of substrate surface can be low for achieving a given coating thickness. Dimethylformamide can also be used for coating substrates at very high temperatures without creating a fire hazard.

When selecting an aprotonic solvent for use in carrying out the invention, preference is given to those having a dielectric constant greater than 15 and a dipolar moment greater than 3D. It has been found that these are properties of the most satisfactory of the aprotonic solvents. Such properties are possessed by all of the specific aprotonic solvents described above. (D=Debye unit)

The preferred groups of solvents for carrying out the invention also include substituted and unsubstituted monocarboxylic acids. Preference is given to aliphatic substituted and unsubstituted monocarboxylic acids, particularly good examples being acetic acid ($CH_3COOH$), butyric acid ($CH_3CH_2COOH$), acrylic acid ($CH_2CHCOOH$), thioglycolic acid ($HSCH_2COOH$), and formic acid ($HCOOH$).

The third of the specified preferred groups of solvents which can be used in carrying out the invention comprises amine and diamine solvents. Preference is given to alkyl and alkylene amino and diamino solvents in which the amino group(s) are unsubstituted, particularly good examples include: ethylene diamine, propylene diamine, butyl amine, propyl amine.

While emphasis has been placed on the use of a solvent or solvents selected from the special classes or groups described above, it is to be understood that other solvents can be used, particularly in circumstances where the formed oxidic coating does not have to satisfy very stringent optical specifications. Thus it is in certain cases suitable to use an alcohol or a hydrocarbon solvent, e.g., an aromatic solvent such as benzene, toluene or xylene.

When using certain of the solvents belonging to the specified preferred classes, and particularly when using a substituted or unsubstituted monocarboxylic acid, advantages are sometimes to be gained by the addition of a small amount of inorganic acid, e.g., HCl, $HNO_3$, or $H_2SO_4$.

Preference is given to embodiments of the invention in which the coprecipitate applied to the substrate is an acetyl acetonate coprecipitate of two or more metals selected from the group: Fe, Ni, Co, Zn, V, Cu, Cr, Zr, Mn.

Other important embodiments are embodiments in which the coprecipitate applied to the substrate is an acetyl acetonate coprecipitate of two or more metals selected from the group comprising the metals described above and also comprising Bi, Y, W and In.

By making such a selection, metal oxide coatings can be formed which are hard, are very adherent to the substrate and which have well defined optical properties.

As already indicated, the invention is of special importance for forming metal oxide coatings on vitreous and partly vitreous substrates, e.g., substrates of vitrocrystalline or vitroceramic material. This is because of the ability of the process in its preferred embodiments to produce thin metal oxide coatings of a high degree of uniformity in thickness and density which are properties particularly looked for in optical coatings for the purpose of tinting or otherwise modifying the optical properties of the bodies or articles in which they are formed. In the following further description the invention will be considered mainly in the context of the optical coating of vitreous and partly vitreous substrates, for which purpose coatings which are at least partly composed of an oxide compound containing two or more of the metals hereinbefore listed are the ones which are mainly but no means exclusively useful.

Vitreous and partly vitreous articles or bodies of any shape can be coated by the process to impart a predetermined tint thereto, but more particularly in order to impart special light-reflecting properties. The process is very advantageous for forming all-over coatings on transparent vitreous bodies and articles, e.g., on vehicle windscreens or glazing sheets because metal oxide coatings can be formed which give the article or body a predetermined tint as viewed both by transmitted and reflected light. The process is not only useful for forming a metal oxide coating directly on a glass or partly vitreous surface but also for forming such a metal oxide coating on an already formed coating film which is strongly adherent to the vitreous substrate, and particularly on an existing metal oxide film, e.g., a film of titanium or copper oxide.

One intersecting application of the process is its use for coating a heat-absorbing glass with a highly reflecting layer, without substantially increasing the energy absorption.

The light or energy transmission of a coating of a given thickness can be increased without substantially altering the light or energy reflectance, by adding to the solution an acetyl acetonate such as that of aluminum, zinc, thorium, cerium or yttrium.

For forming an optical coating on flat glass, the process can be particularly economically performed by spraying a solution of an acetyl acetonate coprecipitate of two or more metals onto a continuous glass ribbon in course of its production, e.g., at a coating station located at the drawing chamber of a glass drawing machine or in an annealing lehr. The solution is preferably applied where the glass is at temperatures within the temperature range 300° to 700°, most preferably 450°C to 650°C, as hereinbefore referred to. It is very suitable to direct the spray of coating solution normally to the glass ribbon and to reciprocate the spraying device transversely of the direction of movement of the ribbon past the coating station. In such a process it is of course desirable to use a non-inflammable and non-explosive solvent, such as a solvent of one of the preferred classes hereinbefore referred to, unless special safety precautions are taken. It is preferred to use an aprotonic solvent, a substituted or unsubstituted monocarboxylic acid solvent or an amine or diamine solvent.

For the purposes mainly in view the thickness of the metal oxide coating which is formed preferably lies in the range 200 to 1,200 A. The thickness chosen in any given case will depend on the intended function of the coating. A coating of a given thickness can if necessary or desired be built up by applying two or more layers in succession. The thickness of a coating can best be measured by interferometry, but it is also possible to dissolve the coating and to determine the weight of the coating per unit surface area analytically, the thickness then being calculated taking into account the known density of the oxides and their degree of compaction in the coating.

By performing the invention under the most favorable conditions as disclosed herein, high quality optical coatings can be formed. In other cases, the formed coating may occasionally be marred by small dark stains often referred to as "pittings." It is to be noted, however, that the appearance of such defects to any material degree depends in part on various other factors, and more particularly on the composition and geometry of the coated surface and the coating thickness. For example, when forming a coating on patterned glass having a fairly close pattern or on wired or profiled glass, e.g., glass bodies of U-shape, the defects are much less apparent than when forming a coating on plane-faced flat glass. Even when the coating is formed on a plane glass face, the presence of defects tends to be less apparent as the thickness of the coating becomes greater. On the other hand, the greater the thickness of the coating the less is the light-transmissivity of the coating. Where this factor is of importance, the optimum coating thickness represents a compromise between the competing objectives of freedom from defects and a high degree of light-transparency.

Coatings formed according to the invention and using the preferred coating ingredients are very hard. Glazings bearing such coatings can be used with the coating exposed because it is for normal purposes sufficiently resistant to mechanical damage.

The wettability of a vitreous support by a solution of the acetyl acetonate coprecipitate can be improved, in order to promote uniformity of coating, by means of suitable additives. For example, up to 10% by weight of acetyl acetone or iron acetyl acetonate or even zinc acetate may be added to the solvent.

A very considerable range of mixed oxide coatings can be formed by a process according to the invention.

For example, compounds of the type $AB_2O_4$ can be formed, in which A is a bivalent metal such as Zn, Fe, Mn, Co, Ni, and B is a trivalent metal such as In, Fe, Cr, Co. Examples of compounds of this structure are zinc cobaltite ($ZnCo_2O_4$), the chromites of cadmium, nickel zinc, manganese and iron, manganese ferrite ($MnFe_2O_4$) and similarly the ferrites of cobalt, copper, cadmium, manganese, nickel, zinc, etc.

It is also possible to form compounds of the type $ABO_3$ in which the sum of the degrees of oxidation of the elements A and B is 6, A being a bivalent or trivalent metal and B being a tetravalent or trivalent metal respectively. Examples of compounds of such a structure are nickel zirconate ($NiZrO_3$) and even the zirconates of zinc, iron, copper, cobalt, etc.

It is also possible to form compounds of the type $A_2B_2O_7$, in which A is a trivalent cation and B is a tetravalent cation, for example yttrium zirconate $Y_2Zr_2O_7$ or even where A is a bivalent cation and B is a pentavalent cation, for example nickel vanadate ($Ni_2V_2O_7$) compounds of the type $ABO_4$ where A is a trivalent cation and B a pentavalent cation, for example iron vanadate ($FeVO_4$) or chromium vanadate ($CrVO_4$); and compounds of the type $ABO_4$ where A is a bivalent and B a hexavalent cation, for example nickel tungstate ($NiVO_4$).

The potential range of optical and other specifications which can be fulfilled by oxide coatings formed in accordance with the invention is particularly large, in view of the fact that for obtaining coatings of a particular tint, viewed by transmitted and/or reflected light, it is possible to use a coating composition comprising an acetyl acetonate coprecipitate of more than two metals, e.g., of three metals. A particular example is an acetyl acetonate coprecipitate of vanadium, iron and nickel. It is also within the scope of the invention to use a coating composition comprising a mixture of different acetyl acetonate coprecipitates of two or more metals. Thus, merely by way of example, a composition may be used comprising an acetyl acetonate coprecipitate of iron and copper, mixed with an acetyl acetonate coprecipitate of chromium and manganese; or a mixture of an acetyl acetonate coprecipitate of vanadium and zinc, with an acetyl acetonate coprecipitate of iron and nickel.

To test the hardness and adherence of coatings obtained by the process according to the invention, use can be made of a reciprocating rubbing element having a surface area of 1 $cm^2$ and formed by rubber incorporating corundum grains 75–125 microns in diameter. The rubbing member is set in a weighted tube (weight of assembly: 100 gr) sliding vertically in a support. Constant contact is therefore ensured between the rubbing member and the sample. The assembly formed by the rubbing member and the support is reciprocated by a crank system. The amplitude of the movement is 3 cm, its frequency being 1 reciprocation per second. After a certain time, a pattern of wear is obtained formed by scratches very close together with undestroyed coating left therebetween. In general, coatings formed according to the invention are hard and firmly adherent to vitreous substrates. For example, the abrasion test has to be continued for an hour and a half to spoil 95 percent of the surface area subjected to rubbing.

The invention includes a coating composition comprising an acetyl acetonate coprecipitate of two or more metals represented in the group: Fe, Ni, Co, Zn, V, Cu, Zr, Cr, Mn, Bi, Y, W and In.

The invention also includes a method of preparing an acetyl acetonate coprecipitate of two or more metals selected from the above mentioned group wherein a solution of compounds of at least two different metals is brought into contact with a solution of acetyl acetone, the compounds being selected from the group of hydroxides, halides, carbonates and nitrates.

Advantageously, a solution of freshly precipitated hydroxides is brought into contact with a solution of acetyl acetone. This procedure is particularly suitable in the case of metals selected from the group Fe, Co and Ni.

It is also preferable that an aqueous solution of two or more halides is brought into contact with an aqueous solution of alkali metal acetate (anhydrous or not) and acetyl acetone. This procedure is suitable more particularly in the case that the metals are selected from the group: Co, Cr, Cu, Fe, Mn, Ni, V, Zn, W, Bi and In.

In certain embodiments, an aqueous solution of nitrates of two metals is brought into contact with an aqueous solution of alkali metal carbonate and acetyl acetone. This procedure is suitable more particularly in the case that the metals are selected from the group: Co, Cr, Cu, Fe, Mn, Ni, Zn, Zn, Zr, Th and Y.

According to another procedure, an aqueous solution of the nitrates of two or more metals is brought into contact with an aqueous solution of $NH_4OH$ and acetyl acetone. This procedure is suitable more particularly in the case of metals such as Mn, In, and Fe.

In a further embodiment of the process of preparing a coprecipitate, an alcoholic solution of the nitrates of two or more metals is brought into contact with acetyl acetone. This procedure is suitable more particularly for the metals Co, Cr, Cu.

In order to give the acetyl acetonate coprecipitate satisfactory solubility, it is preferably in the perfectly crystallised state. If necessary the precipitate obtained is recrystallised in alcohol.

Advantageously, the amount of acetyl acetone theoretically required from the stoichiometric point of view is doubled or trebled to obtain a high yield of acetyl acetonate coprecipitate. In this way a yield very close to 100 percent can be reached.

The invention also includes a solution of an acetyl acetonate coprecipitate as above defined or as prepared by a process above defined.

Preferably, the solvent used in the solution of the acetyl acetonate coprecipitate comprises an aprotonic solvent, a substituted or unsubstituted monocarboxylic acid solvent, an amine or diamine solvent or a mixture of two or more solvents selected from solvents of those classes. Advantageously one or more of the solvents, belonging to those classes which have been hereinbefore specifically identified is used.

In other embodiments, the solution of the acetyl acetonate coprecipitate comprises an alcohol or hydrocarbon as solvent. Prudent use will be made of alcohols, e.g., methyl alcohol, ethyl alcohol and propylic alcohol, and hydrocarbons, which latter class of solvents includes, inter alia, aromatic hydrocarbons such as benzene toluene, and xylene.

A solvent which is very suitable in many cases is glacial acetic acid, even if the acetyl acetonate coprecipitate crystallises in hydrated form. Dimethyl formamide is also very suitable.

The dissolving of the coprecipitate in the selected solvent or solvents should preferably be carried out gradually.

The invention will be better understood and its advantages better appreciated from the following description of a number of non-limitative Examples thereof.

In the following Examples, it should be noted in practice that if a start is made from two metal salts in equimolar proportions, the result will not necessarily be an acetyl acetonate coprecipitate in which the two metals are in equimolar concentrations, this being explained by the difference in reactivity (or yield) of the different metals. For instance, if an acetyl acetonate coprecipitate equimolar in two metals is to be obtained, a start will be made, for instance, from an equimolar mixture of salts of two metals, and an analysis will be made of the acetyl copreciptate obtained; this will enable a correctional factor to be established by calculation. If the correction proves to be inadequate, a second correction will be made by calculation.

EXAMPLE 1

This Example relates to the formation of copper ferrites ($CuFe_2O_4$) in three tests each using one of the mixtures A, B and C.

For these tests the salts specified in Table 1, were dissolved in the stated amounts, in one litre of demineralised water.

TABLE 1.

|  | A | B | C |
|---|---|---|---|
| $FeCl_3.6H_2O$ | 0.2 mole | 0.35 mole = 95 gm. | 0.65 mole |
| $CuCl_2 2H_2O$ | 0.8 mole | 0.65 mole = 110 gm. | 0.35 mole |

For each of the mixtures A, B and C, 638 gm. of sodium acetate crystallising with $3H_2O$ (4.7 moles) was dissolved in two litres of demineralised water and 482 cc of acetyl acetone (4.7 moles).

The solutions of chlorides and acetate were heated to 55°C. One of the acetate solutions was poured into each of the chloride solutions at a rate of 3 litres per hour.

The precipitate obtained was filtered, washed with water, dried and recrystallised in ethyl alcohol. The three acetyl acetonate coprecipitates of copper and iron were recovered. The characteristics of these coprecipitates are set out in Table 2.

TABLE 2.

|  | A | B | C |
|---|---|---|---|
| Weight of acetyl acetonate recovered | 292 gr | 304 gr | 294 gr |
| Weight of copper | 51 gr | 22.3 gr | 19.1 gr |
| Weight of iron | 11.2 gr | 36.3 gr | 33.5 gr |
| Tint | blue | red | bright red |

Each of the three acetyl acetonate coprecipitates was then dissolved in glacial acetic acid in an amount of 285 gr per 0.8 litre. The solutions A, B, C were separately applied by a spraying gun to three glass ribbons 3 metres in width during movement thereof past the coating station at a speed of 1.5 metres per minute. In these coating operations, use was made of an internal mixing gun fed with compressed air and coating solution, both at a pressure 2.5 to 3.0 kg/cm² above atmospheric pressure. The nozzle of the gun was at a distance of 20 cm from the glass. The glass was at a temperature of 580°C, while the solutions, A.B.C. were at ambient temperature. The gun was reciprocated perpendicularly to the direction of forward movement of the glass ribbon, the gun reciprocating at a frequency of 1 reciprocation every six seconds.

Allowing for losses of the coating solution, the amounts of mixed oxide effectively deposited per square metre of surface were 0.035 gr; 0.231 gr; 0.245 gr for the tests A,B,C. Coatings containing copper ferrite, on its own or with the addition of CuO and/or $Fe_2O_3$ were obtained having the characteristics set out in the following table 3.

TABLE 3.

|  | A | B | C |
|---|---|---|---|
| Thickness in A | 450 | 450 | 450 |
| Weight of CuO per m² | 0.248 g | 0.017 g | 0 g |
| Tint in Transparency | bronze | grey-brownish | grey |
| Tint in Reflection | grey-yellowish | grey | grey |
| Light transmission (%) | 43.6 | 51.2 | 54.3 |
| Energy transmission (%) | 53.5 | 56.2 | 54.0 |
| Light reflection (%) | 34.2 | 29.8 | 29.1 |
| Energy reflection (%) | 27.8 | 21.1 | 23.2 |
| Energy absorption (%) | 18.7 | 22.7 | 22.8 |
| Light transmission / Energy transmission | = 0.81 | 0.91 | 1.01 |

EXAMPLE 2

7.85 gr of $VCl_3$ and 13.5 gr of $FeCl_3.6H_2O$ were quickly dissolved simultaneously in 100 cc of distilled water. A second solution was formed by dissolving 60 cc of acetyl acetone in a solution of 200 cc of water containing 81 gr of sodium acetate.

The two solution were heated to 60°C, whereafter the second solution was slowly poured into the first one, over a period of half an hour. A well-crystallised red precipitate was formed which was filtered, washed with demineralised water and dried. 35.2 gr of acetyl acetonate coprecipitate of trivalent vanadium and trivalent iron were obtained. Examination under an optical microscope revealed the difference between crystals of this coprecipitate and a mixture, having the same molarity, of crystals of vanadium acetyl acetonate and iron acetyl acetonate.

The coprecipitate obtained as above described was rapidly dissolved in 200 cc of dimethylformamide at ambient temperature.

The resulting solution was sprayed onto a substrate under the same conditions as those of Example 1. A film containing iron vanadate ($FeVO_4$) was obtained having a greenish-gray tint in transmission and a grey tint in reflection.

Other energy properties of the coating were as follows:

| | |
|---|---|
| Light transmission(%): | 52.0 |
| Energy transmission (%): | 47.7 |
| Light reflection (%): | 30.9 |
| Energy reflection (%): | 24.8 |
| Energy absorption (%): | 27.5 |

$$\frac{\text{Light transmission}}{\text{Energy transmission}} = 1.09$$

A similar film can be obtained by replacing the dimethylformamide by acetonitrile, tetramethylurea, ethylene carbonate, tetramethylenesulphone, nitrobenzene, dimethylsulphoxide, dimethylacetamide, hexamethylphosphoramide toluene, benzene or xylene.

Example 3

An acetyl acetonate coprecipitate of Zn and Co was prepared as follows:

1 mole of $Co(NO_3)_2.6H_2O$ (291g) and 1 mole of $Zn(NO_3)_2.6H_2O$ (297 g) were dissolved in two litres of demineralised water;

2 moles of $Na_2CO_3$ (212 g) were dissolved in four litres of demineralised water and 600 cc of acetyl acetone;

The two solutions were heated to 40°C;

the carbonate solution was poured into the nitrate solution accompanied by strong agitation, the reaction taking place during 1 hour;

the pink coprecipitate was washed, dried and recrystallised in alcohol. 520 gr of acetyl acetonate coprecipitate of Zn and Co were recovered.

The coprecipitate was dissolved in three litres of a mixture containing 50 percent by volume of methanol and 50 percent of n-butylamine.. The solution thus obtained was sprayed under the same conditions as those of Example 1, at a rate of 10 litres per hour.

The result was a coating containing zinc cobaltite ($ZnCo_2O_4$) having the following properties:

| | |
|---|---|
| Thickness: | 575 A |
| Tint in transmission: | grey-greenish |
| Tint in reflection: | grey |
| Light transmission (%): | 48.7 |
| Light reflection (%): | 27.5 |
| Energy transmission (%): | 46.3 |
| Energy reflection (%): | 24.2 |
| Energy absorption (%): | 29.5 |

$$\frac{\text{Light transmission}}{\text{Energy transmission}} = 1.05$$

A second test was made in which only 300 cc of acetyl acetone was used instead of 600 cc. Only 234 gr of acetyl acetonate coprecipitate were recovered. The hardness and adherence of the coating formed were tested by the hardness test hereinbefore described. It took at least an hour and a half to scratch away 95 percent of the coating.

An identical result was obtained when methanol was replaced by ethanol or propanol.

EXAMPLE 4

An acetyl acetonate coprecipitate of Zn and Cr of violet tint was prepared in a manner similar to the preceding Examples — i.e., by reacting one mole of zinc chloride ($ZnCl_2$) (136 g) and one mole of chromium chloride ($CrCl_3.6H_2O$) (266 g) with 10 moles of acetyl acetone (1000 cc) in the presence of 10 moles of anhydrous sodium acetate (820 g). After dissolving the acetyl acetonate coprecipitate in dimethylformamide, a coating containing zinc chromite ($ZnCr_2O_4$) was formed by the same technique as that set forth in Example 1.

The thin coating film had the following properties:

| | |
|---|---|
| Thickness: | 620 A |
| Tint in transmission: | grey greenish |
| Tint in reflection: | grey |
| Light transmission (%): | 55.3 |
| Light reflection (%): | 26.2 |
| Energy transmission (%): | 56.1 |
| Energy reflection (%): | 24.3 |

$$\frac{\text{Light transmission}}{\text{Energy transmission}} = 0.98$$

In a second test, the coprecipitate was dissolved in dimethylformamide to which 10 percent HCl had been added. It was found that the solubility of the acetyl acetonate coprecipitate was greater by 30 percent than when using dimethylformamide alone as solvent.

The coating film containing zinc chromite obtained by applying this solution of the coprecipitate im dimethylformamide and hydrochloric acid, which coating was formed by the same technique as that set out in Example 1, was clearly more grey in transparency than the zinc chromite film of the first test, and the film had the following properties:.

| | |
|---|---|
| Light transmission (%): | 48.0 |
| Light reflection (%) | 29.3 |
| Energy transmission (%): | 45.2 |
| Energy reflection (%): | 28.9 |
| Energy absorption (%): | 25.9 |

$$\frac{\text{Light transmission}}{\text{Energy transmission}} = 1.06$$

EXAMPLE 5

Using the techniques set forth in the preceding description concerning the formation of the acetyl acetonates of various metals, a number of acetyl acetonate coprecipitates were prepared which were then dissolved in different solvents and applied by spraying as in the method described in Example 1. Coating films were obtained, constituted at least in part of the following oxidic compounds and having the specified tints in transparency and reflection:

| Solvent | | Tint in transparency | Tint in reflection |
|---|---|---|---|
| $Ni_2V_2O_7$ | Acrylic acid | yellow | grey-greenish |
| $NiCr_2O_4$ | Dimethylformamide | rose | blue |
| $MnFe_2O_4$ | Formic acid | brown-grey | grey |
| $CoCr_2O_4$ | Dimethylformamide | grey | grey |
| $CrVO_4$ | Ethylene diamine | yellow | green |
| $CuCr_2O_4$ | Dimethylformamide | blue-grey | grey |
| $NiZr_3O$ | Propylamine | Grey | grey |
| $Y_2Zr_2O_7$ | Nitrobenzene | blue-grey | yellow |
| $NiWo_4$ | Dimethylformamide | yellowish | yellow |
| $InVO_4$ | Propylene diamine | yellowish-grey | grey |
| $BiVO_4$ | Thioglycolic acid | yellowish-grey | grey |

Examination of the coatings by an electron microscope showed the difference in structure between the structure of the oxidic compounds formed by conversion of the acetyl acetonate coprecipitates and that structure of oxides formed from a mixture of two simple metal acetyl acetonates of the same molarity.

It will be understood that this invention is susceptible to modification in order to adapt it to different usages and conditions, and accordingly, it is desired to comprehend such modifications within this invention as may fall within the scope of appended claims.

What is claimed is:

1. In a process for forming a metal oxide on a substrate comprising applying at least one metal compound to the substrate and thermally converting said compound to a metal oxide coating, the improvement wherein the metal compound is an acetyl acetonate coprecipitate of two or more metals dissolved in a solvent, and said solvent being selected from the group consisting of an aprotonic solvent, a substituted or unsubstituted monocarboxylic acid, an amine or diamine solvent and mixtures of two or more of said solvents.

2. In a process according to claim 1 wherein the step of thermally converting includes heating the coated substrate.

3. In a process according to claim 1 wherein the substrate is pre-heated to a sufficiently high temperature to provide the heat required to effect the conversion of the coprecipitate.

4. In a process according to claim 3 wherein the substrate is pre-heated to bring the temperature of the surface to be coated to a value within the range of 300° to 700°C.

5. In a process according to claim 1 wherein the solution is applied in droplet form.

6. In a process according to claim 1 wherein the solvent comprises an aprotonic solvent having a dielectric constant greater than 15 and a dipolar moment greater than 3D.

7. In a process according to claim 6 wherein the solvent comprises dimethylformamide.

8. In a process according to claim 1 wherein a substituted or unsubstituted monocarboxylic acid solvent is used.

9. In a process according to claim 1 wherein the solvent comprises an alkyl or alkylene amine or diamine in which the amino group or groups are unsubstituted.

10. In a process according to claim 1 wherein an alkyl or alkylene amine or diamine solvent is used.

11. In a process according to claim 1 wherein the coprecipitate is an acetyl acetonate coprecipitate of two or more metals represented in the group: Fe, Ni, Co, Zn, V, Cu, Cr, Zr or Mn.

12. In a process according to claim 1 wherein the coprecipitate is an acetyl acetonate coprecipitate of two or more metals represented in the group: Fe, Ni, Co, Zn, V, Cu, Zr, Cr, Mn, Bi, Y, W or In.

13. In a process according to claim 1 and wherein the substrate is at least partly vitreous.

14. In a process according to claim 13 wherein the composition is selected and applied so that the formed metal oxide coating is a light-transmitting coating.

15. In a process according to claim 14 wherein the formed metal oxide coating has a thickness in the range of 200 to 1,200 A.

16. In a process according to claim 1 wherein the substrate is flat glass.

17. In a process according to claim 16 wherein the glass is at a temperature in the range of 450° to 650° at the time of coating.

18. An article of manufacture made in accordance with the process of claim 1.

19. An article of manufacture according to claim 18 wherein the substrate is vitreous or partly vitreous.

* * * * *